United States Patent [19]

Shipley et al.

[11] 4,376,065

[45] Mar. 8, 1983

[54] ORGANO ZIRCONIUM-CHROMIUM COMPOUND, CATALYST PREPARED THEREFROM AND POLYMERIZATION OF OLEFINS THEREWITH

[75] Inventors: Randall S. Shipley, Alvin; Fred L. Vance, Jr., Lake Jackson, both of Tex.

[73] Assignee: The Dow Chemical Company, Midland, Mich.

[21] Appl. No.: 269,232

[22] Filed: Jun. 1, 1981

[51] Int. Cl.³ .................................................. C08F 4/64
[52] U.S. Cl. ............................. 252/429 B; 252/429 C; 252/430; 252/441; 526/114
[58] Field of Search ............... 252/429 C, 431 R, 430, 252/441, 429 B

[56] References Cited

U.S. PATENT DOCUMENTS

| | | | |
|---|---|---|---|
| 3,752,795 | 8/1973 | Boone | 260/88.2 R |
| 3,847,957 | 11/1974 | Boone | 252/431 R X |
| 3,879,362 | 4/1975 | Chalfont et al. | 252/431 R X |
| 3,932,307 | 1/1976 | Setterquist | 252/430 |
| 3,943,067 | 3/1976 | Chan et al. | 252/429 C X |
| 3,971,767 | 7/1976 | Setterquist | 526/65 |
| 4,011,383 | 3/1977 | Setterquist | 526/154 |
| 4,017,525 | 4/1977 | Setterquist | 260/429.3 |
| 4,031,298 | 6/1977 | Pullukat | 526/113 |
| 4,035,561 | 7/1977 | Hoff et al. | 526/130 |
| 4,053,437 | 11/1977 | Liu et al. | 252/458 |
| 4,109,071 | 8/1978 | Berger et al. | 252/429 C X |
| 4,154,701 | 5/1979 | Melquist | 252/429 C X |
| 4,204,050 | 5/1980 | Bressler et al. | 252/429 C X |
| 4,310,648 | 1/1982 | Shipley et al. | 252/429 C X |

*Primary Examiner*—Patrick Garvin
*Attorney, Agent, or Firm*—J. G. Carter

[57] ABSTRACT

Dual transition metal compounds containing zirconium and chromium are prepared by reacting a tetrahydrocarbyloxy zirconium compound such as tetraisopropoxy zirconium or a tetravalent hydrocarbyloxy zirconium halide such as triisopropoxy zirconium halide with a chromium compound such as $CrO_3$. These compounds, as well as combinations of other soluble chromium and zirconium compounds, are useful in the polymerization of α-olefins to produce polymers having a high molecular weight and a narrow molecular weight distribution.

8 Claims, No Drawings

ORGANO ZIRCONIUM-CHROMIUM COMPOUND, CATALYST PREPARED THEREFROM AND POLYMERIZATION OF OLEFINS THEREWITH

BACKGROUND OF THE INVENTION

The present invention concerns compositions useful in the preparation of catalysts, the catalysts and the polymerization of olefins employing these catalysts.

Dual transition metal compounds containing both chromium and titanium have been employed in the preparation of catalysts for olefin polymerization in U.S. Pat. Nos. 3,752,795 and 3,847,957. Such dual transition metal compounds are formed by reacting a tetraorganotitanate with chromium oxide.

Typically, catalysts in which a chromium compound is employed to polymerize ethylene show a sizable response to both hydrogen and temperature. As a result, most catalyst systems containing chromium must be run at low reaction temperatures (i.e., slurry conditions) to prevent the formation of large amounts of undesirable low molecular weight waxes or high melt index polyethylene.

It has now been discovered that compounds prepared from chromium oxide and a tetravalent zirconium compound can be employed in catalysts suitable for the polymerization of olefins which show a low hydrogen response and which can produce polyethylene having a high molecular weight at high reaction temperatures (i.e., solution conditions).

SUMMARY OF THE INVENTION

One aspect of the present invention concerns dual transition metal compounds which are the reaction product of a chromium compound and a tetravalent zirconium compound.

Another aspect of the present invention concerns a catalyst for polymerizing α-olefins which comprises (a) the aforementioned reaction product, (b) a solid catalyst support, (c) an organometallic activating agent or cocatalyst and (d) a trivalent or tetravalent titanium compound.

Another aspect of the invention is a process for polymerizing α-olefins which comprises conducting the polymerization in the presence of the aforementioned catalyst. Olefins polymerized in such a manner show high polymer molecular weights with very narrow molecular weight distributions.

DESCRIPTION OF THE INVENTION

Suitable zirconium compounds which can be employed in the preparation of the compounds of the present invention containing both chromium and zirconium include those represented by the empirical formula $(RO)_n ZrX_{4-n}$ wherein R is a monovalent hydrocarbyl group, X is a halogen such as chlorine, bromine or iodine, preferably chlorine or bromine, and n has a value of from 0 to 4.

Those zirconium compounds containing both hydrocarbyloxy and halogen groups are readily prepared by the simple admixture of a zirconium tetrahalide ($ZrX_4$) and a zirconate ($Zr(OR)_4$), preferably in the presence of an inert solvent. The reaction proceeds presumably according to the following chemical equation

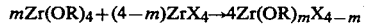

wherein m has a value of 1 to 3. Another method of preparation can be illustrated by the equation

wherein m has a value of 1 to 3.

The term hydrocarbyl as employed herein means alkyl, cycloalkyl, aryl, aralkyl, alkenyl and similar hydrocarbon radicals having from 1 to about 20 carbon atoms, with alkyl having from 1 to about 10 being especially preferred.

The term hydrocarbyloxy as employed herein means alkyloxy, cycloalkyloxy, aryloxy, aralkyloxy, alkenyloxy and similar oxyhydrocarbyl radicals having from 1 to about 20 carbon atoms with alkyloxy having from 1 to about 10 carbon atoms being preferred.

Particularly suitable tetravalent zirconium compounds include, for example,
tetra-n-butoxy zirconium,
tetra-n-propoxy zirconium,
tetra-isopropoxy zirconium,
tetraphenoxy zirconium,
tri-n-butoxy zirconium chloride,
tri-n-propoxy zirconium chloride,
tri-isopropoxy zirconium chloride,
mixtures thereof and the like. These compounds may be obtained from a number of commercial manufacturers or may be generated in situ during reaction as previously described.

Suitable chromium compounds include those compounds of chromium which contain oxygen. Such compounds can be represented by the empirical formulae $CrO_3$ and $CrO_2X_2$, wherein X is a halogen, preferably chlorine or bromine.

Particularly suitable chromium compounds include chromium trioxide, chromium oxydichloride, mixtures thereof and the like.

The reaction between the zirconium compounds and the chromium compounds may be carried out in the presence or absence of a suitable hydrocarbon solvent or diluent, as hereinafter defined, by merely mixing the reactants together. Alternatively, a solvent or diluent may be employed and the product formed liquified by reaction at temperatures of from about 0° C. to about 300° C., preferably from about 100° C. to about 200° C., at pressures of from about 1 atm to about 10 atm. The reaction is most preferably conducted at a temperature of from about 125° C. to about 150° C. at elevated pressure, e.g. 50 psi (3.5 kg/cm²). The time to sufficiently complete the reaction depends upon the particular temperature being employed and is usually from about 30 minutes to about 72 hours, preferably from about 1 hour to about 24 hours.

The molar ratio of chromium compound to zirconium compound is from about 0.05:1 to about 6:1, preferably from about 0.1 to about 2:1 and most preferably from about 0.2:1 to about 1:1. At ratios lower than 0.05:1 very small amounts of product are formed and at quantities above about 6:1, portions of unreacted chromium compound are wasted. These unreacted quantities of chromium compound may also be used to form the Cr-Zr complex, if additional amounts of zirconium compound are added and additional heating as described above is carried out. The preferred reaction products are those which are hydrocarbon soluble wherein the average value of m in the empirical formula $CrO_3 \cdot mZr(OR)_4$ is less than about 20, preferably less than about 10.

Suitable inert solid support materials which can be employed herein are magnesium oxide, magnesium chloride, mixtures thereof and the like.

A particularly suitable inert support material is one which is prepared by reacting an organometallic compound, particularly an organomagnesium compound, with a halide source to produce a support having a very high ($>100$ m$^2$/gm) surface area.

A suitable organomagnesium compound is a hydrocarbon soluble complex illustrated by the empirical formula $MgR''_2 \cdot xAlR''_3$ wherein each $R''$ is independently hydrocarbyl or hydrocarbyloxy, and x has a value from about zero to about 10, especially from about 0.015 to about 0.25. As used herein, hydrocarbyl and hydrocarbyloxy are monovalent hydrocarbon radicals. Preferably, hydrocarbyl is alkyl, cycloalkyl, aryl, aralkyl, alkenyl and similar hydrocarbon radicals having 1 to 20 carbon atoms, with alkyl having 1 to 10 carbon atoms being especially preferred. Likewise, preferably, hydrocarbyloxy is alkoxy, cycloalkyloxy, aryloxy, aralkyloxy, alkenyloxy and similar oxyhydrocarbon radicals having 1 to 20 carbon atoms, with alkyloxy having 1 to 10 carbon atoms being preferred. Hydrocarbyl is preferred over hydrocarbyloxy. In order to obtain maximum catalyst efficiency at polymerization temperatures above 180° C., it is desirable to minimize the amount of aluminum in the complex as well as in the total catalyst. Accordingly, for catalysts having Al:Ti atomic ratios less than 120:1, it is desirable to have a Mg:Al atomic ratio more than 0.3:1, preferably from about 0.5:1 to 10:1.

Preferably, the organomagnesium compound is a hydrocarbon soluble dihydrocarbylmagnesium such as the magnesium dialkyls and the magnesium diaryls. Exemplary suitable magnesium dialkyls include particularly n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-n-octyl magnesium and others wherein the alkyl has from 1 to 20 carbon atoms. Exemplary suitable magnesium diaryls include diphenylmagnesium, dibenzylmagnesium, and ditolylmagnesium. Suitable organomagnesium compounds include alkyl and aryl magnesium alkoxides and aryloxides and aryl and alkyl magnesium halides with the halogen-free organomagnesium compounds being more desirable. These organomagnesium compounds are available commercially from several sources including Texas Alkyls, Inc., Lithium Corporation of America or Schering Ag Industrie-Chemikalien.

The halide source is suitably a non-metallic halide corresponding to the empirical formula $R'X$ wherein $R'$ is hydrogen or an active monovalent organic radical and X is halogen. Alternatively, the halide source is a metallic halide corresponding to the empirical formula $MR_{y-a}X_a$ wherein M is a member of Groups IIIA or IVA of the Periodic Table of the Elements by Sargent-Welch, catalog number S-18806; R is a monovalent organic radical, usually hydrocarbyl or hydrocarbyloxy; X is halogen; y is a number corresponding to the valence of M and a is a number from 1 to y.

The preferred halide sources are the active non-metallic halides of the formula set forth hereinbefore including hydrogen halides and active organic halides such as t-alkyl halides, allyl halides, benzyl halides and other active hydrocarbyl halides wherein hydrocarbyl is as defined hereinbefore. By an active organic halide is meant a hydrocarbyl halide that contains a labile halogen at least as active, i.e., as easily lost to another compound, as the halogen of sec-butyl chloride, preferably as active as t-butyl chloride. In addition to the organic monohalides, it is understood that organic dihalides, trihalides and other polyhalides that are active as defined hereinbefore are also suitably employed. Examples of preferred active non-metallic halides include hydrogen chloride, hydrogen bromide, t-butyl chloride, t-amyl bromide, allyl chloride, benzyl chloride, crotyl chloride, methylvinyl carbinyl chloride, α-phenylethyl bromide, diphenyl methyl chloride and the like. Most preferred are hydrogen chloride, t-butyl chloride, allyl chloride and benzyl chloride.

Suitable metallic halides as set forth by formula hereinbefore are organometallic halides and metal halides wherein the metal is in Group IIIA or IVA of said Periodic Table of Elements. Preferred metallic halides are tin halides or aluminum halides of the empirical formula $AlR_{3-a}X_a$ wherein each R is independently hydrocarbyl as hereinbefore defined, X is a halogen and a is a number from 1 to 3. Most preferred are alkylaluminum halides such as ethylaluminum sesquichloride, diethylaluminum chloride, ethylaluminum dichloride, and diethylaluminum bromide, with ethylaluminum dichloride being especially preferred. Alternatively, a metal halide such as tin tetrachloride or aluminum trichloride or a combination of tin tetrachloride or aluminum trichloride with an alkyl aluminum halide or a trialkyl aluminum compound may be suitably employed.

A sufficient quantity of the halide source is employed so as to provide a small amount of halide in excess of that required to completely react with the support metal compound in those instances where the support metal compound is reactable therewith such as reacting a dialkyl magnesium compound with a halide source.

It is understood that the organic moieties of the aforementioned organomagnesium, e.g., $R''$, and the organic moieties of the halide source, e.g., R and $R'$, are suitably any other organic radical provided that they do not contain functional groups that poison conventional Ziegler catalysts. Preferably such organic moieties do not contain active hydrogen, i.e., those sufficiently active to react with the Zerewitinoff reagent.

In order to maximize catalyst efficiency, the catalyst is prepared by mixing the components of the catalyst in an inert liquid diluent in any order in which the titanium species is not over-reduced by the magnesium alkyl, that is, so that the magnesium alkyl is converted to $MgCl_2$ before it can over-reduce the active metal.

The foregoing catalytic reaction product is preferably carried out in the presence of an inert diluent or solvent. The concentrations of catalyst components are preferably such that when the essential components of the catalytic reaction product are combined, the resultant slurry is from about 0.005 to about 1.0 molar (moles/liter) with respect to magnesium.

By way of an example of suitable inert organic diluents or solvents can be mentioned liquefied ethane, propane, isobutane, n-butane, n-hexane, the various isomeric hexanes, isooctane, paraffinic mixtures of alkanes having from 6 to 12 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, and especially those having boiling points in the range from about −50° to about 200° C. Also included as suitable inert diluents are benzene, toluene, ethylbenzene, cumene, decalin and the like.

Mixing of the catalyst components to provide the desired catalytic reaction product is advantageously carried out under an inert atmosphere such as nitrogen, argon or other inert gas at temperatures in the range from about −100° to about 200° C., preferably from about 0° to about 100° C. The period of mixing is not considered to be critical as it is found that a sufficient catalyst composition most often occurs within about 1 minute or less. In the preparation of the catalytic reaction product, it is not necessary to separate hydrocarbon soluble components from hydrocarbon insoluble components of the reaction product.

In the catalysts of the present invention, the components are employed in quantities so as to provide the following atomic ratios.

Mg:Cr atomic ratio is from about 1:1 to about 200:1, preferably from about 10:1 to about 150:1 and most preferably from about 20:1 to about 100:1.

Al:Cr atomic ratio is from about 1:1 to about 250:1, preferably from about 10:1 to about 200:1 and most preferably from about 25:1 to about 150:1.

Cr:Ti atomic ratio is from about 0.1:1 to about 10:1, preferably from about 0.2:1 to about 3:1 and most preferably from about 0.3:1 to about 1.5:1.

Cr:Zr atomic ratio is from about 0.05:1 to about 6:1, preferably from about 0.1:1 to about 2:1 and most preferably from about 0.2:1 to about 1:1.

Excess X:Al atomic ratio is from about 0.0005:1 to about 5:1, preferably from about 0.002:1 to about 2:1 and most preferably from about 0.01:1 to about 1:1.

Excess X is defined as the excess halide above that which would be theoretically required to convert the magnesium compound to the dihalide.

In those instances where the halide source does not contain a reducing metal such as aluminum or contains an insufficient quantity thereof, then an organometallic compound is added so as to provide the desired quantity of reducing metal.

The organometallic activating agent or cocatalyst is suitably any reducing component commonly employed in Ziegler polymerization. For example, the cocatalyst may be any organometallic reducing compound employed in conventional Ziegler polymerization, preferably an alkyl aluminum compound having at least two alkyl groups per aluminum, e.g., aluminum trialkyls or dialkyl aluminum halides. Examples include aluminum triethyl, aluminum triisobutyl, aluminum triisopropyl, aluminum trimethyl, diethyl aluminum chloride and others wherein the alkyl has from 1 to 12 carbons and halide is preferably chloride or bromide. Preferably, the organometallic reducing compound is present in concentrations sufficient to provide an atomic ratio of reducing metal to transition metal in the range from about 1:1 to about 250:1, preferably from about 10:1 to about 200:1, especially from about 25:1 to about 150:1. Typically, the smaller amounts within this range are employed at higher reaction temperatures (>140° C.).

Such activating agents or cocatalysts are generated in situ when an aluminum alkyl halide is employed as the halide source in the preparation of the inert solid support from an organomagnesium compound such as a dihydrocarbyl magnesium compound.

The tetravalent titanium compounds employed include those represented by the empirical formula $(RO)_m TiX_{4-m}$ wherein R is a monovalent hydrocarbyl group as previously defined, X is a halogen, preferably chloride or bromine, and m has a value from zero to 4.

Particularly suitable tetravalent titanium compounds include, for example, $Ti(OiPr)_4$, $Ti(OnBu)_4$, $Ti(OiPr)_2Cl_2$, $TiCl_4$, mixtures thereof and the like.

Suitable trivalent titanium compounds include, for example, titanium trichloride or titanium trichloride complexes. The trivalent titanium complex is represented by the empirical formula $TiZ_3(L)_x$ wherein Z is halide, and L is an electron donating compound such as water or an organic electron donor, e.g., alcohol, ether, ketone, amine or olefin, and x is a number from 1 to 6. Usually, the organic electron donor has from 1 to 12 carbon atoms and donates an unshared pair of electrons to the complex. In preferred complexes, Z is chloride or bromide, most preferably chloride, and L is alcohol, especially an aliphatic alcohol having 2 to 8 carbon atoms and most preferably 3 to 6 carbon atoms such as isopropyl alcohol, n-propyl alcohol, n-butyl alcohol and isobutyl alcohol. While the exact structure of the complex is not known, it is believed to contain 3 valence bonds to the halide ions and 1 to 6, preferably 2 to 4 coordination bonds to the electron donating compound. The titanium halide complex is most advantageously prepared by heating the trivalent titanium halide dispersed in the electron donating compound under nitrogen or similar inert atmosphere. Usually the formation of the complex is visually indicated by a definite change in color. For example, when the dark purple α-TiCl₃ is heated in anhydrous isopropyl alcohol under nitrogen, complex formation is indicated by the formation of a brilliant blue solution. The complex is normally solid; however, liquid complexes would be suitable. Such catalyst systems are taught by Birkelbach in U.S. Pat. No. 4,120,820 which is incorporated herein by reference.

In addition to a α-TiCl₃, the Δ, γ and β crystalline forms of titanium trichloride are advantageously employed in the preparation of the complex. Also suitable are titanium tribromide, titanium trifluoride and the like. Of the foregoing, the Δ- and α-forms of titanium trichloride are preferred. Exemplary electron donating compound suitably employed include aliphatic alcohols, e.g., isopropyl alcohol, ethanol, n-propyl alcohol, butanol and others having from 1 to 10 carbon atoms; ethers, ketones, aldehydes, amines, olefins and the like having from 1 to 12 carbon atoms and water.

In addition to complexes of trivalent titanium, complexes of tetravalent titanium are also advantageously employed. Such complexes are prepared by the reaction of a dialkyl zinc (diethyl zinc, for example) with a tetrahydrocarbyloxy titanium (tetraisopropyl titanium, for example) to form brilliantly colored and highly active catalyst species. Such catalyst systems are taught by Shipley in U.S. Pat. No. 4,250,286 which is incorporated herein by reference.

The titanium compound is employed in quantities so as to provide a Ti:Zr atomic ratio of from about 0.01:1 to about 10:1, preferably from about 0.02:1 to about 2:1, most preferably from about 0.05:1 to about 1:1.

Olefins which are suitably homopolymerized or copolymerized in the practice of this invention are generally the aliphatic α-monoolefins or non-conjugated α-diolefins having from 2 to about 18 carbon atoms. Illustratively, such α-olefins can include ethylene, propylene, butene-1, pentene-1, 4-methylpentene-1, hexene-1, octene-1, dodecene-1, octadecene-1, 1,7-octadiene, 1,4- hexadiene and the like. It is understood that α-olefins may be copolymerized with other α-olefins and/or with small amounts, e.g., up to about 25 weight percent based on the polymer, of other ethylenically unsaturated monomers such as styrene, α-methylstyrene and similar ethylenically unsaturated monomers which do not destroy conventional Ziegler catalysts. Most benefits are realized in the polymerization of aliphatic α-monoolefins, particularly ethylene and mixtures of ethylene and up to 50, especially from about 0.1 to about 40, weight percent of at least one other α-olefin such as, for example, propylene, butene-1, hexene-1, octene-1, 4-methylpentene-1, 1,7-octadiene or similar α-olefin or nonconjugated diolefin based on total monomer.

In the polymerization process employing the aforementioned catalytic reaction product, polymerization is effected by adding a catalytic amount of the above catalyst composition to a polymerization zone containing at least one α-olefin monomer, or vice versa. The polymerization zone is maintained at temperatures in the range from about 0° to about 300° C., preferably at solution polymerization temperatures, e.g., from about 130° to about 250° C., for a residence time of about a few seconds to several days, preferably 15 seconds to 2 hours. It is generally desirable to carry out the polymerization in the absence of moisture and oxygen and a catalytic amount of the catalytic reaction product is typically within the range of about 0.0001 to about 0.1 millimoles titanium per liter of diluent. It is understood, however, that the most advantageous catalyst concentration will depend upon polymerization conditions such as temperature, pressure, solvent and presence of catalyst poisons and that the foregoing range is given to obtain maximum catalyst yields in weight of polymer per unit weight of titanium. A carrier employed in the polymerization process is generally an inert organic diluent or solvent or excess monomer. In order to realize the full benefit of the high efficiency catalyst of the present invention, care must be taken to avoid oversaturation of the solvent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitably as defined hereinbefore.

The polymerization pressures preferably employed are relatively low, e.g., from about 50 to about 1000 psig, especially from about 100 to about 600 psig. However, polymerization within the scope of the present invention can occur at pressures from atmospheric up to pressures determined by the capabilities of the polymerization equipment. During polymerization it is desirable to stir the polymerization recipe to obtain better temperature control and to maintain uniform polymerization mixtures throughout the polymerization zone.

In order to optimize catalyst yields in the polymerization of ethylene, it is preferable to maintain an ethylene concentration in the solvent in the range from about 1 to about 10 weight percent, most advantageously about 1.2 to about 2 weight percent. To achieve this, when an excess of ethylene is fed into the system, a portion of the ethylene can be vented.

Hydrogen can be employed in the practice of this invention to lower the molecular weight of the resultant polymer. For the purpose of this invention, it is beneficial to employ hydrogen in concentrations ranging from about 0.001 to about 1 mole per mole of monomer. The larger amounts of hydrogen within this range are found to produce lower molecular weight polymers. It is understood that hydrogen can be added with a monomer stream to the polymerization vessel or added separately to the vessel before, during or after addition of the monomer to the polymerization vessel, but during or before the addition of the catalyst. It is also understood that, as a result of this invention, higher amounts of hydrogen are necessary than normally required to obtain a given melt index.

The monomer or mixture of monomers is contacted with the catalytic reaction product in any conventional manner, preferably by bringing the catalytic reaction product and monomer together with intimate agitation provided by suitable stirring or other means. Agitation can be continued during polymerization, or in some instances, the polymerization can be allowed to remain unstirred while the polymerization takes place. In the case of more rapid reactions with more active catalysts, means can be provided for refluxing monomer and solvent, if any of the latter is present, thus removing the heat of reaction. In any event, adequate means should be provided for dissipating the exothermic heat of polymerization. If desired, the monomer can be brought into contact with the catalytic reaction product in the vapor phase, in the presence or absence of liquid material. The polymerization can be effected in the batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent of the types conventionally employed for deactivating Ziegler catalysts. The resultant polymer is found to contain insignificant amounts of catalyst residue and to possess a very narrow molecular weight distribution at relatively high molecular weights.

The following examples are given to illustrate the invention, and should not be construed as limiting its scope. All parts are by molar ratio and percentages are by weight unless otherwise indicated.

In the following examples, the melt index values $I_2$ and $I_{10}$ were determined by ASTM D 1238-70 and the density values were determined by ASTM D 1248.

EXAMPLE 1

Three grams of finely ground $CrO_3$ were placed in a high pressure stirred reaction bomb followed by the addition of 10 ml of Isopar ® E (an isoparaffinic hydrocarbon fraction with a boiling range of 116°–134° C.). After adding 19.68 grams of zirconium tetra-n-propoxide. $Zr(OnPr)_4$, the mixture was heated, with stirring, to a temperature of 200° C. under autogenous pressure. After 24 hours, the mixture was cooled and filtered (under nitrogen) to remove unreacted $CrO_3$. The percent conversion to hydrocarbon soluble complex based on chromium was 16%. The resulting greenish product had an atomic ratio of Cr:Zr of 1:12.3 and is represented by the empirical formula $CrO_3.12.3\ Zr(OnPr)_4$. The product was stored in an amber bottle for subsequent use in the event that it was sensitive to light.

thermal termination is low, but is unexpected for high temperature (solution phase) polymerizations.

TABLE I

| Example Number | Atomic Ratio | | | | | psig $C_2H_4$ | psig $H_2$ | Efficiency #PE/#Ti | Melt Index | | Density |
|---|---|---|---|---|---|---|---|---|---|---|---|
| | Cr:Ti | Al:Cr | Mg:Cr | Cr:Zr | XsCl:Al | | | | $I_2$ | $I_{10}$ | |
| 2 | 1:1 | 50:1 | 40:1 | 1:12.3 | 0.4:1 | 310 | 19 | $1.37 \times 10^6$ | 0.40 | 4.39 | 0.9598 |
| 3 | 1:1 | 50:1 | 40:1 | 1:12.3 | 0.4:1 | 300 | 29 | $0.58 \times 10^6$ | 0.97 | 8.32 | 0.9630 |
| 4 | 1:1 | 50:1 | 40:1 | 1:12.3 | 0.4:1 | 280 | 59 | $0.95 \times 10^6$ | 1.28 | 12.50 | 0.9641 |
| A | 0:1 | 50:0 | 40:0 | 1:12.3 | 0.4:1 | 310 | 19 | $2.19 \times 10^6$ | 4.02 | 34.87 | 0.9652 |

EXAMPLES 2–4 AND COMPARATIVE EXPERIMENT A

A. Catalyst Preparation (Examples 2–4)

A catalyst composition was prepared by adding, with stirring, under a nitrogen atmosphere, to a 4-ounce (118.28 cc) serum bottle the following components in the indicated order.

| | |
|---|---|
| 94.29 ml | of Isopar ® E |
| 0.8 ml | of 0.94 M ethyl aluminum dichloride, EADC, in Isopar ® E |
| 0.6 ml | of 0.025 M tetraisopropoxy titanium, $Ti(OiPr)_4$, in Isopar ® E |
| 1.11 ml | of 0.54 M n-butyl-sec-butyl magnesium, DBM, in Isopar ® E (obtained from Lithium Corporation of America |
| 3.20 ml | of 0.00468 M $CrO_3.12.3\ Zr(OnPr)_4$ in |
| 100.00 ml | Isopar ® E |

The order of addition in the preparation of the catalyst is important only from the standpoint that the titanium compound cannot be in contact with the organomagnesium component without the halide source also being present as illustrated in the above catalyst preparation.

B. Catalyst Preparation (Comparative Experiment A)

As a comparative experiment, a catalyst was produced as above except that none of the $CrO_3.12.3\ Zr(OnPr)_4$ (present invention) was added. In its place was added an additional amount of Isopar ® E.

C. Polymerization (Examples 2–4 and Comparative Experiment A

A stirred batch reactor containing 2 liters of Isopar ® E was heated to 150° C. The solvent vapor pressure was 21 psig (1.48 kg/cm²). To this was added varying quantities of hydrogen and ethylene for a total reactor pressure of 350 psig (24.06 kg/cm²). A quantity of the above catalyst was injected into the reactor (wherein 10 ml=0.0015 mMoles Ti) and the reactor pressure was held constant at 350 psig (24.06 kg/cm²) with ethylene. The total reaction time was 30 minutes. The polymerization results are given in Table I.

These runs conclusively demonstrate the decreased hydrogen response of catalysts prepared using the Cr-Zr complex. Increasing the partial pressure of hydrogen in the reactor from 19 to 59 psig only raised the melt index from 0.40 to 1.28 gm/10 min. The comparative experiment shows a much higher melt index than this at the lowest partial pressure of hydrogen (19 psig). This low hydrogen response is not unusual for runs made at low temperature (slurry conditions) where

EXAMPLES 5–10

A. Catalyst Preparation (Examples 5–9)

Component 1

This part of the catalyst was prepared by adding, with stirring under a nitrogen atmosphere to a 4-ounce (118.28 cc) serum bottle the following components in the indicated order.

| | |
|---|---|
| 97.6 ml | of Isopar ® E |
| 0.8 ml | of 0.94 M EADC in Isopar ® E |
| 0.6 ml | of 0.025 M $Ti(OiPr)_4$ in Isopar ® E |
| 1.0 ml | of 0.60 M DBM in Isopar ® E |
| 100.00 ml | |

Component 2

This part of the catalyst was prepared in the same manner as above with the following components.

| | |
|---|---|
| 96.8 ml | of Isopar ® E |
| 3.2 ml | of 0.00468 M $CrO_3.12.3\ Zr(OnPr)_4$ in |
| 100.00 ml | Isopar ® E |

B. Polymerization

A stirred batch reactor containing 2 liters of Isopar ® E was heated to 150° C. The solvent vapor pressure was 21 psig (1.48 kg/cm²). To this was added 19 psig (1.34 kg/cm²) of hydrogen and from 300 to 320 psig (21.04 to 22.5 kg/cm²) of ethylene. An amount of the catalyst component 2 (wherein 10 ml=0.0015 mMoles Cr) as previously prepared was injected into the reactor, followed by an amount of the catalyst component 1 (wherein 10 ml=0.0015 mMoles Ti). The reactor pressure was held constant with ethylene. The total reaction time was 30 minutes. Polymerization results are given in Table II.

C. Catalyst Preparation and Polymerization (Example 10)

Identical reactor conditions were used as in examples 5–9 above. In the catalyst, however, 0.6 ml of a 0.025 M $TiCl_4$ solution in Isopar ® E was substituted for the $Ti(OiPr)_4$. The polymerization results are given in Table II.

These examples (5–9) show that the addition of the Cr-Zr complex not only lower the melt index (compare with comparative experiment A), but lead to a narrower molecular weight distribution than expected. These resins would have excellent impact strength and would be of use in rotational molding applications.

Example 10 shows that using a catalyst prepared with a different titanium source still exhibits a lowered melt index and narrow molecular weight distribution.

TABLE II

| Example Number | ml Catalyst Component 1 | ml Catalyst Component 2 | Atomic Ratio Cr:Ti | Atomic Ratio Al:Cr | Atomic Ratio Mg:Cr | Atomic Ratio Cr:Zr | XsX:Al | psig C$_2$H$_4$ | psig H$_2$ | Efficiency #PE/#Ti | Melt Index I$_2$ | Melt Index I$_{10}$ | I$_{10}$/I$_2$ | Expected* I$_{10}$/I$_2$ | Density |
|---|---|---|---|---|---|---|---|---|---|---|---|---|---|---|---|
| 5 | 20 | 10 | 0.50:1 | 100:1 | 80:1 | 1:12.3 | 0.4:1 | 310 | 19 | 1.28 × 10$^6$ | 1.49 | 10.39 | 6.97 | 9.26 | 0.9631 |
| 6 | 25 | 15 | 0.60:1 | 83.3:1 | 66.7:1 | 1:12.3 | 0.4:1 | 310 | 19 | 0.67 × 10$^6$ | 0.49 | 5.08 | 10.37 | 12.10 | 0.9609 |
| 7 | 15 | 10 | 0.67:1 | 75:1 | 60:1 | 1:12.3 | 0.4:1 | 310 | 19 | 0.86 × 10$^6$ | 0.62 | 4.56 | 7.35 | 11.42 | 0.9592 |
| 8 | 20 | 15 | 0.75:1 | 66.7:1 | 53.3:1 | 1:12.3 | 0.4:1 | 310 | 19 | 1.06 × 10$^6$ | 0.39 | 3.88 | 9.95 | 12.59 | 0.9602 |
| 9 | 10 | 10 | 1:1 | 50:1 | 40:1 | 1:12.3 | 0.4:1 | 310 | 19 | 0.81 × 10$^6$ | 0.48 | 4.89 | 10.19 | 12.10 | 0.9508 |
| 10 | 20 | 10 | 0.50:1 | 100:1 | 80:1 | 1:12.3 | 0.4:1 | 310 | 19 | 1.20 × 10$^6$ | 0.93 | 8.22 | 8.84 | 10.33 | 0.9611 |

*Calculated by the empirical formula:

$$I_{10}/I_2 = 6.8881 + 4.1219\left(\frac{1}{x}\right) - .9358\left(\frac{1}{x}\right)^2 + 0.0762\left(\frac{1}{x}\right)^3$$

where x = melt index (I$_2$) and is greater than 0.2.

This formula was derived from a plot of several standard runs for high density polyethylene. For all catalysts, the following ratios were employed: Al:Ti = 50:1; Mg:Ti = 40:1

EXAMPLES 11–12 AND COMPARATIVE EXPERIMENT B

Two separate catalyst components were prepared as described in examples 5–10. Then a stirred batch reactor containing 2 liters of Isopar ® E was heated to 150° C. The solvent vapor pressure was 21 psig (1.48 kg/cm$^2$). To this was added 240 ml of 1-octene, 4 psig of hydrogen and 175 psig of ethylene for a total pressure of 200 psig. An amount of the catalyst component 2 (wherein 10 ml=0.0015 mMoles Ti) was injected into the reactor, followed by an amount of catalyst component 1 (wherein 10 ml=0.0015 mMoles Ti). The reactor pressure was held constant with ethylene. The total reaction time was 30 minutes. Polymerization results are given in Table III.

A similar procedure was followed for comparative experiment B, however no component 2 was added to the reactor. The polymerization results for this comparative example are also given in Table III.

Examples 11 and 12 both show that an unexpected lowering of the copolymer melt index occurs when using the Cr-Zr complex in conjunction with the catalyst.

10 ml=0.0015 mMoles Cr) was injected into the reactor, followed by an amount of the catalyst component 1 (wherein 10 ml=0.0015 mMoles Ti). The reactor pressure was held constant with ethylene. The total reaction time was 30 minutes. Polymerization results are given in Table IV.

A similar procedure was used to prepare comparative experiment C, however component 2 was not added to the reactor.

These runs demonstrate that much lower melt indices are produced when using the Cr-Zr compound than without it. The comparative experiment C was a medium melt index, very low density copolymer which was very sticky and not of much commercial use. Since no hydrogen was present, the only way to lower the melt index would be by lowering reactor temperature. In a continuous polymerization process, this would lead to lower throughput. The copolymers produced with the Cr-Zr compound, however, have a much lower melt index but still have a very low density. This is surprising since the incorporation of high levels of comonomer generally leads to increased chain termination with resulting lower molecular weights or higher melt indices (as seen in comparative experiment C). These runs therefore indicate that the Cr-Zr compound affects chain termination and allows the formation of these low melt indices, low density copolymers which are not sticky or tacky, appear to be very rubbery, and which would be of commercial interest in such applications an impact modifiers in, for example, polypropylene and polystyrene.

TABLE III

| Example Number | ml Catalyst Component 1 | ml Catalyst Component 2 | Atomic Ratio Cr:Ti | Atomic Ratio Al:Cr | Atomic Ratio Mg:Cr | Atomic Ratio Cr:Zr | XsX:Al | psig C$_2$H$_4$ | psig H$_2$ | Efficiency #PE/#Ti | Melt Index I$_2$ | Melt Index I$_{10}$ | I$_{10}$/I$_2$ | Density |
|---|---|---|---|---|---|---|---|---|---|---|---|---|---|---|
| 11 | 20 | 10 | 0.50:1 | 100:1 | 80:1 | 1:12.3 | 0.4:1 | 175 | 4 | 0.76 × 10$^6$ | 0.855 | 6.46 | 7.56 | 0.9331 |
| 12 | 25 | 10 | 0.40:1 | 125:1 | 110:1 | 1:12.3 | 0.4:1 | 175 | 4 | 0.78 × 10$^6$ | 0.443 | 4.67 | 10.53 | 0.9381 |
| B | 15 | 0 | 0:1 | 50:0 | 40:0 | — | 0.4:1 | 175 | 4 | 1.60 × 10$^6$ | 2.70 | 19.32 | 7.16 | 0.9354 |

EXAMPLES 13–15 AND COMPARATIVE EXPERIMENT C

Two separate catalyst components were prepared as described in examples 5–10. Then a stirred batch reactor containing 2 liters of 1-octene was heated to 150° C. The solvent vapor pressure was 21 psig (1.48 kg/cm$^2$). To this was added an amount of ethylene and hydrogen. Then, an amount of the catalyst component 2 (wherein

TABLE IV

| Example Number | ml Catalyst Component 1 | ml Catalyst Component 2 | Atomic Ratio Cr:Ti | Atomic Ratio Al:Cr | Atomic Ratio Mg:Cr | Atomic Ratio Cr:Zr | XsX:Al | psig C$_2$H$_4$ | psig H$_2$ | Efficiency #PE/#Ti | Melt Index I$_2$ | Melt Index I$_{10}$ | I$_{10}$/I$_2$ | Density |
|---|---|---|---|---|---|---|---|---|---|---|---|---|---|---|
| 13 | 10 | 1.7 | 0.17:1 | 294:1 | 235:1 | 1:12.3 | 0.4:1 | 170 | 0 | 3.41 × 10$^6$ | 7.34 | 108.04 | 14.71 | 0.8744 |
| 14 | 10 | 3.8 | 0.38:1 | 132:1 | 105:1 | 1:12.3 | 0.4:1 | 320 | 0 | 2.26 × 10$^6$ | 0.17 | 3.14 | 18.47 | 0.8951 |
| 15 | 10 | 3.3 | 0.33:1 | 152:1 | 121:1 | 1:12.3 | 0.4:1 | 320 | 11 | N.D.* | 1.24 | 12.62 | 10.18 | 0.8972 |
| C | 10 | 0 | 0:1 | 50:0 | 40:0 | — | 0.4:1 | 170 | 0 | 1.86 × 10$^6$ | 21.27 | 231.4 | 10.88 | 0.8721 |

*N.D.—Not determined
For all catalysts, the following ratios were employed: Al:Ti = 50:1; Mg:Ti = 40:1

We claim:

1. As a composition of matter, the reaction product of (1) a zirconium compound or mixture of such compounds thereof represented by the empirical formula $(RO)_m ZrX_{4-m}$ wherein R is a monovalent hydrocarbyl group having from 1 to about 20 carbon atoms, X is a halogen, and m has a value from 0 to 4; with (2) an inorganic oxygen-containing chromium compound or mixture of such compounds represented by the empirical formulas $CrO_3$ or $CrO_2X_2$; wherein X is a halogen and wherein the mole ratio of component (2) to component (1) is of from about 0.05:1 to about 6:1.

2. A composition of claim 1 wherein in components (1) and (2) X is chlorine or bromine and wherein the mole ratio of component (2) to component (1) is from about 0.10:1 to about 2:1.

3. A composition of claim 2 wherein each R is independently an alkyl group having from 2 to about 10 carbon atoms and wherein the mole ratio of component (2) to component (1) is from about 0.2:1 to about 1:1.

4. A composition of claim 3 wherein the chromium compound is $CrO_3$ or $CrO_2Cl_2$ or a mixture of such compounds and the zirconium compound is $Zr(OnPr)_4$ or $Zr(OiPr)_4$ or a mixture of such compounds.

5. A catalyst composition which comprises
   (A) the reaction product of
      (1) a zirconium compound, or mixture of such compounds represented by the empirical formula $(RO)_m ZrX_{4-m}$; wherein R is a monovalent hydrocarbyl group having from 1 to about 20 carbon atoms, X is a halogen and m has a value from 0 to 4; and
      (2) an inorganic oxygen-containing chromium compound represented by the empirical formulae $CrO_3$ or $CrO_2X_2$; wherein R and X are as defined above; and wherein the mole ratio of component (2) to component (1) is from about 0.05:1 to about 6:1;
   (B) a solid catalyst support containing magnesium;
   (C) at etrahydrocarbyloxy titanium or titanium halide compound; and
   (D) an organometallic activating agent; wherein the Mg:Cr atomic ratio is from about 1:1 to about 200:1; the Al:Cr atomic ratio is from about 1:1 to about 250:1, the Cr:Ti atomic ratio is from about 0.1:1 to about 50:1; and the excess X:Al atomic ratio is from zero to about 5:1.

6. A catalyst composition of claim 5 wherein
   (i) in component (A-1) R is a monovalent hydrocarbyl group having from 1 to about 20 carbon atoms, X is chlorine or bromine and m has a value from 0 to 4;
   (ii) in component (A-2) R and X are as defined above;
   (iii) the molar ratio of component (A2) to component (A1) is from about 0.1:1 to about 2:1;
   (iv) said Mg containing support, component (B), is prepared by reacting (a) a compound represented by the empirical formula $MgR''_2 \cdot xAlR''_3$ wherein each R'' is independently a hydrocarbyl or a hydrocarbyloxy group having from 1 to about 20 carbon atoms and x has a value from about zero to about 10 with (b) a halide source selected from non-metallic halides and metallic halides;
   (v) component (C) is a tetrahydrocarbyloxy titanium compound having from 1 to about 10 carbon atoms in each hydrocarbyloxy group;
   (vi) said organometallic activating agent, component (D), is a trialkyl aluminum or a dialkyl aluminum halide wherein each alkyl group independently has from 1 to about 12 carbon atoms and P1 (vii) the Mg:Cr atomic ratio is from about 10:1 to about 150:1, the Al:Cr atomic ratio is from about 10:1 to about 200:1, the Cr:Ti atomic ratio is from about 0.2:1 to about 3:1 and the excess X:Al atomic ratio is from about 0.002:1 to about 2:1.

7. A catalyst composition of claim 6 wherein
   (i) in said zirconium compound and said oxygen-containing chromium compound each R is independently an alkyl group having from 1 to about 10 carbon atoms;
   (ii) the molar ratio of component (A2) to component (A1) is from about 0.2:1 to about 1:1;
   (iii) in component (B) the R groups are independently selected from an alkyl group having from 1 to about 10 carbon atoms and x has a value from about 0.15 to about 2.5;
   (iv) component (D) is a trialkyl aluminum compound and
   (v) the Mg:Cr atomic ratio is from about 20:1 to about 100:1, the Al:Cr atomic ratio is from about 25:1 to about 150:1, the Cr:Ti atomic ratio is from about 0.3:1 to about 1.5:1, and the atomic ratio of excess X:Al is from about 0.01:1 to about 1:1.

8. A catalyst composition of claim 7 wherein the zirconium compound is $Zr(OnPr)_4$, $Zr(OiPr)_4$, or mixture thereof and the oxygen-containing chromium compound is $CrO_3$ or $CrO_2Cl_2$ or mixture thereof.

* * * * *

UNITED STATES PATENT AND TRADEMARK OFFICE
CERTIFICATE OF CORRECTION

PATENT NO. : 4,376,065
DATED : March 8, 1983
INVENTOR(S) : Randall S. Shipley and Fred L. Vance, Jr.

It is certified that error appears in the above—identified patent and that said Letters Patent is hereby corrected as shown below:

Col. 6, line 3; "chloride" should read --chlorine--.

Col. 13, line 39, Claim 5; "(C) at etrahydrocarbyloxy" should read --(C) a tetrahydrocarbyloxy--.

Col. 14, line 21, Claim 6; delete "P1" from this line.

Signed and Sealed this

Twenty-eighth Day of June 1983

[SEAL]

Attest:

GERALD J. MOSSINGHOFF

Attesting Officer           Commissioner of Patents and Trademarks